(12) United States Patent
Fu et al.

(10) Patent No.: US 9,781,065 B2
(45) Date of Patent: Oct. 3, 2017

(54) LIGHTWEIGHT APPLICATION INTEGRATION FOR MOBILE CLOUD COMPUTING

(71) Applicant: SAP SE, Walldorf (DE)

(72) Inventors: Liang Fu, Shanghai (CN); Xiaoyu Yin, Shanghai (CN)

(73) Assignee: SAP SE, Walldorf (DE)

( * ) Notice: Subject to any disclaimer, the term of this patent is extended or adjusted under 35 U.S.C. 154(b) by 11 days.

(21) Appl. No.: 14/583,177

(22) Filed: Dec. 25, 2014

(65) Prior Publication Data

US 2016/0192106 A1   Jun. 30, 2016

(51) Int. Cl.
*H04L 12/58* (2006.01)
*H04W 4/00* (2009.01)
*H04W 4/12* (2009.01)

(52) U.S. Cl.
CPC .............. *H04L 51/18* (2013.01); *H04L 51/16* (2013.01); *H04W 4/001* (2013.01); *H04W 4/12* (2013.01)

(58) Field of Classification Search
CPC ......... H04W 4/12; H04W 4/001; H04W 4/14; H04M 1/72597; H04M 1/72547; H04M 1/72522; H04M 1/72527; H04M 1/72563; H04M 1/72525; H04M 1/72533; H04L 51/046; H04L 67/04; H04L 67/1095; H04L 67/36; H04L 51/16
See application file for complete search history.

(56) References Cited

U.S. PATENT DOCUMENTS

| | | | |
|---|---|---|---|
| 8,972,533 B1* | 3/2015 | Roka | H04L 67/36 348/734 |
| 2002/0032751 A1* | 3/2002 | Bharadwaj | H04L 29/06 709/218 |
| 2007/0178891 A1* | 8/2007 | Louch | H04M 11/007 455/420 |
| 2013/0013671 A1* | 1/2013 | Relan | H04L 67/34 709/203 |
| 2013/0191384 A1* | 7/2013 | Demattei | G06F 17/30595 707/736 |
| 2014/0120901 A1* | 5/2014 | Ward | H04W 4/001 455/419 |

* cited by examiner

*Primary Examiner* — Magdi Elhag
(74) *Attorney, Agent, or Firm* — Jones Day

(57) ABSTRACT

Disclosed herein are technologies to provide lightweight software applications deployable on mobile devices that allow users and intermediary solution providers to receive specific data or information from application or solutions. In accordance with one aspect, a configuration file is uploaded and an input message is received from a user. The input message is mapped to one or more commands related to the configuration file, and the one or more mapped commands is run in order to extract data requested by the input message.

19 Claims, 5 Drawing Sheets

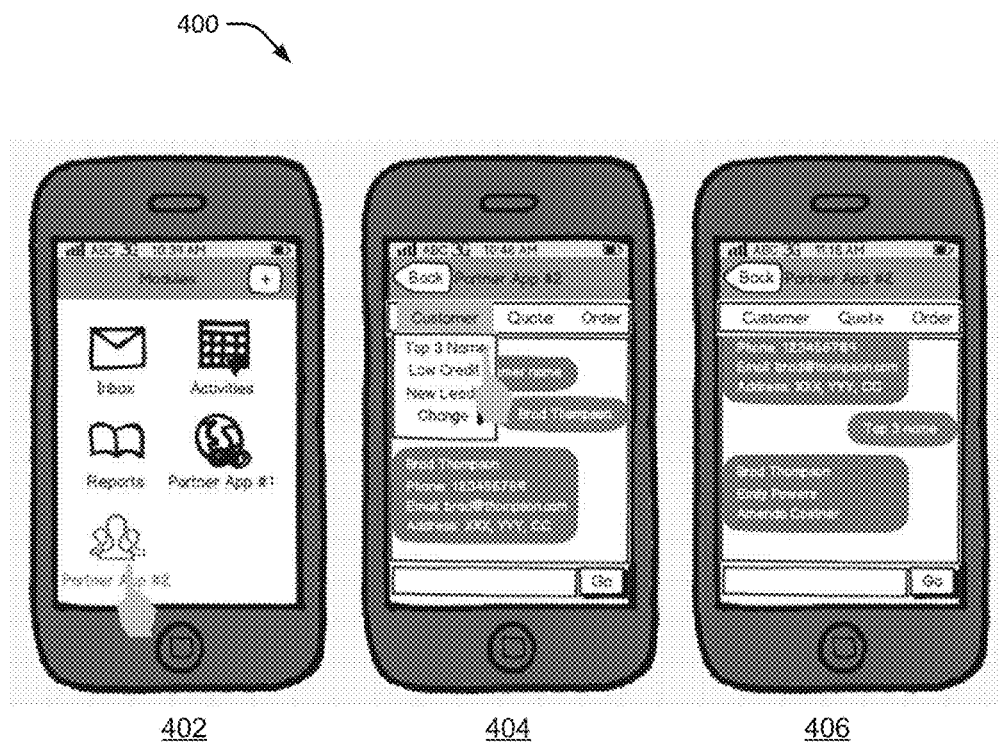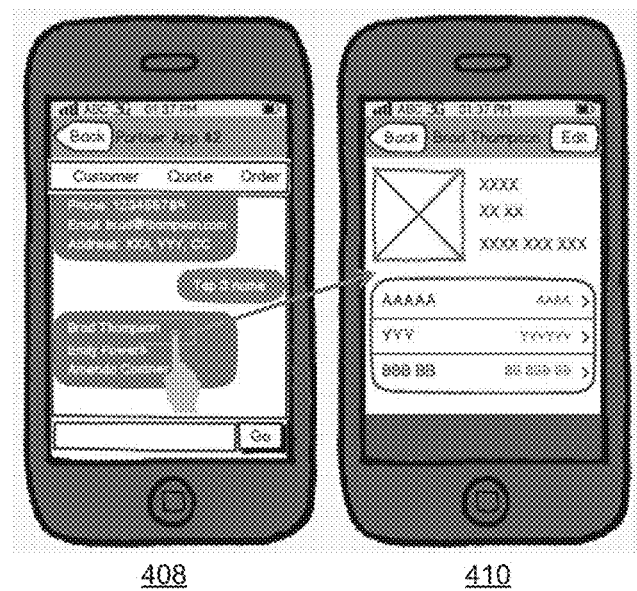
Fig. 4

LIGHTWEIGHT APPLICATION INTEGRATION FOR MOBILE CLOUD COMPUTING

TECHNICAL FIELD

The present disclosure relates generally to allowing users to request and receive specific data or information from network or cloud based application or solution provider.

BACKGROUND

Software applications or solutions may be provided to end users through an intermediary party that receives the application or solution from a software provider. This may particularly be the case, where network or cloud computing is involved. Mobile computing may be involved, where end users have mobile devices implementing the applications or solutions. Various networks may be involved, including the "cloud."

In certain instances, a user or the intermediary party desires to extend or modify the standard application or solution. Reasons for extending may include the desire to receive specific data or information, such as names, multimedia objects, and the like from databases, webpages, etc.

Several issues arise as to the ability to extend or modify the standard application or solution, including unavailability of add-on applications to a mobile application or solution; the difficulty for the user or intermediary to create or modify a mobile application or solution (e.g., learning Android™ Operating System (OS) or iOS™ OS); the effort to learn web development for cross browser or form factor; the unified user interface look and feel; and the difficulty to publish, deploy and maintain a mobile application or solution.

SUMMARY

Disclosed herein are technologies to provide lightweight software applications deployable on mobile devices that allow users and intermediary solution providers to receive specific data or information from application or solutions. In accordance with one aspect, a configuration file is uploaded and an input message is received from a user. The input message is mapped to one or more commands related to the configuration file, and the one or more mapped commands is run in order to extract data requested by the input message.

With these and other advantages and features that will become hereinafter apparent, further information may be obtained by reference to the following detailed description and appended claims, and to the figures attached hereto.

BRIEF DESCRIPTION OF THE DRAWINGS

FIG. 4 illustrates another exemplary process.

The Detailed Description references the accompanying figures. In the figures, the left-most digit(s) of a reference number identifies the figure in which the reference number first appears. The same numbers are used throughout the drawings to reference like features and components.

DETAILED DESCRIPTION

Described herein is a framework to provide lightweight applications allowing users to request and be provided specific data or information. In certain cases, the requests are relatively simple, and follow a type of a "command to action" model. For example, a user may desire to check a particular customer's account information or show a list of top customers. Top customers may be, for instance, those with accounts larger than 1,000 orders. The user may desire to show an order list with matching customers.

In the description, the terms application and solution may be interchangeable. An application may be a software program that is integrated and maintained by a provider. A solution may refer to an application, and may also refer to a webpage. In certain instances, data or information is extracted from the application or solution, or from other applications, solutions, databases, etc., that are accessed by the application or solution.

In this description, the term "lightweight application" is used. A lightweight application may refer generally to a simplified application that is deployed on a user device, such as a mobile device. A lightweight application may be defined as an application that allows for quick user response, allowing the user to provide simple text or graphical commands, returns simple text or graphical messages to the user, and links to various external applications or solutions such as webpages, extracting particular objects requested by the user. A lightweight application may be further defined as not having a complicated business interaction; in others words, having reduced or simplified user interaction. An advanced message-style interface may be provided by the lightweight application allowing the user to input commands by plain text in a message box to the application or solution (i.e., system). The system may return information or data by sending a message back to the user using the lightweight application. The lightweight application may provide a shortcut menu to replace a free text command. A returned message may link to a system or user defined business object, or external webpage. This may be through a universal resource locator or URL.

Figure 1:
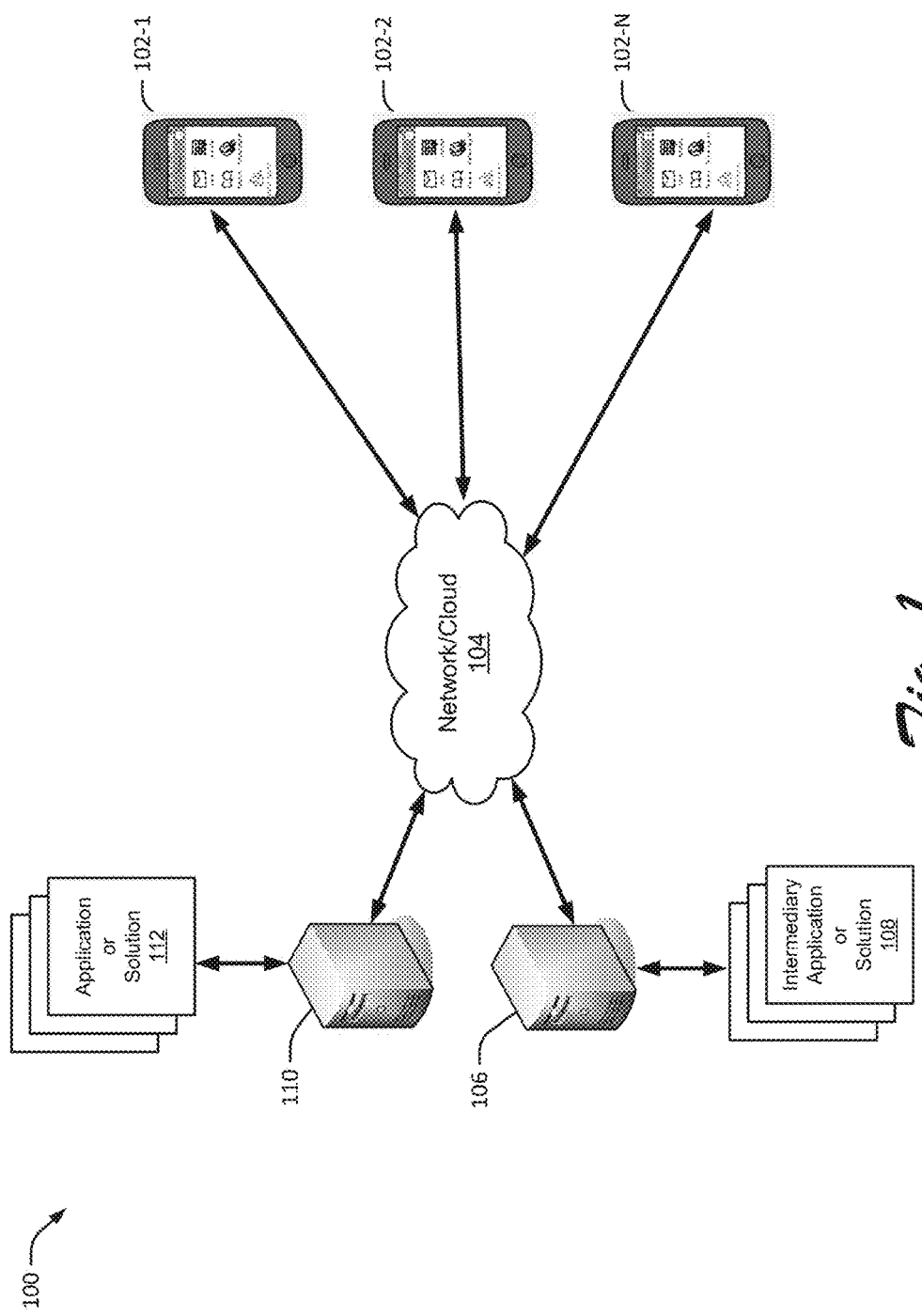
FIG. 1 illustrates an exemplary system.

FIG. 1 shows an example network or system 100 that implements the technologies described herein. Several users 102 are illustrated. In particular, users 102 may have mobile devices running or accessing applications or solutions. In this description, a lightweight application is deployed on the devices of users 102, such as the mobile devices. Users are connected or provided access to one or more networks 104. Network 104 can include the "cloud."

Intermediary party 106 provides intermediary applications or solutions 108 to users 102. Connection between party 106 and users may be through network 104. Applications or solutions 108 may include configuration files that are created, updated and maintained by the intermediary party 106. In particular, the intermediary party 106 prepares configuration files or profiles. The configuration files or profiles support commands and other pattern information that is provided to a software provider 110. For example, pattern information may include extensible markup language (XML) and JavaScript Object Notation (JSON).

The intermediary party 106 in particular, receives requests from the users 102 and sends data or information regarding such requests back to users 102. In certain cases, there may be more than one intermediary party 106.

The software provider 110 provides an application or solution 112. In certain cases, there may be more than one software provider 110. Application or solution 112 may include software applications, and may also include databases, webpages, and any other product or service that includes or is connected to various objects or object code. In particular, application or solution 112 includes information used by intermediary party 106 and users 102. In addition, desired information or data as requested by users 102 through a lightweight application residing on user 102 devices, may be resident or accessible by the application or solution 112.

Figure 2:
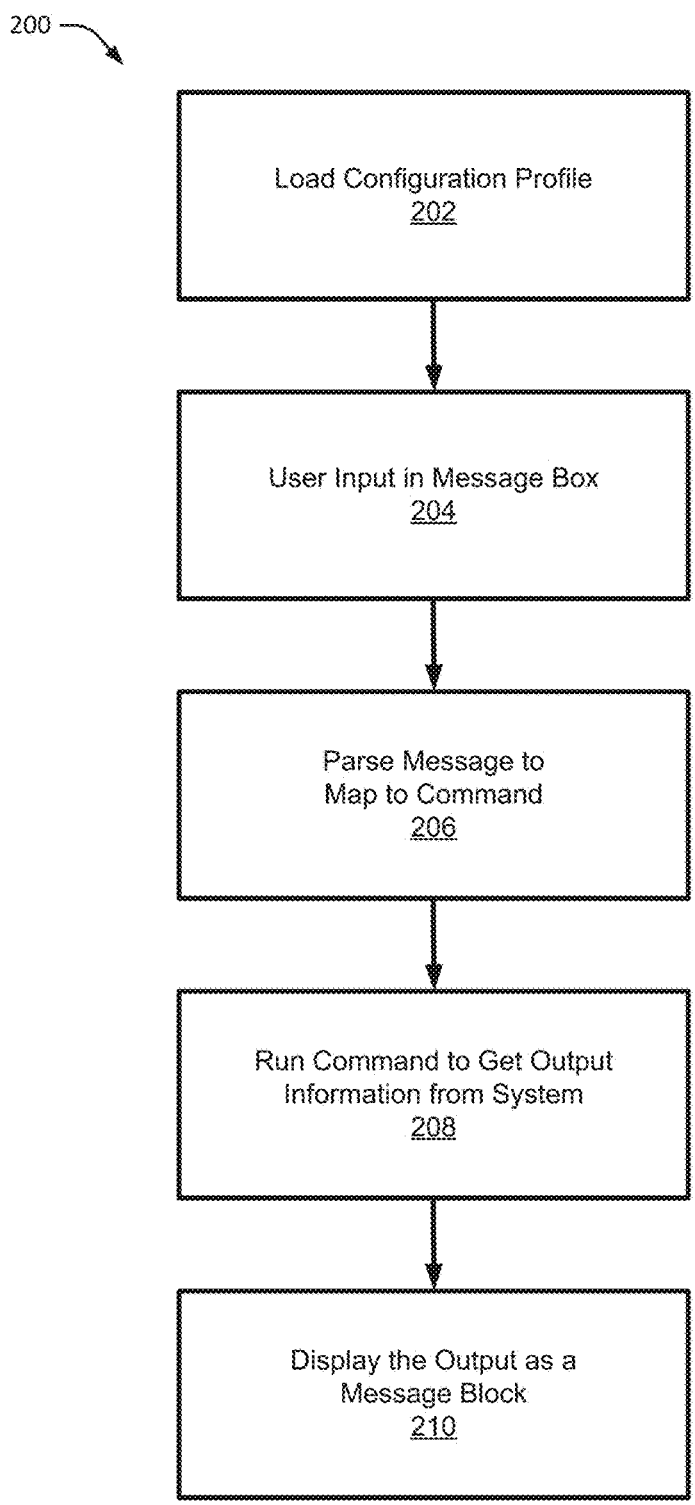
FIG. 2 illustrates an exemplary process.

FIG. 2 shows an exemplary process 200 for implementing, at least in part, the technology described herein. In particular, process 200 depicts a flow as to providing user specific data from a software provider to a user. The process 200 may be performed by a computing device. An example architecture of such a computer device is described below with reference to FIG. 5.

At 202, a configuration profile or file is uploaded. The configuration file may be unique to a user. The configuration files support commands and other pattern information that may be provided to a software provider. For example, pattern information may include extensible markup language (XML) and JavaScript Object Notation (JSON). Uploading may be performed by an intermediary party.

At 204, a user inputs a message. For example, the message may be input in a message box. The message may be in plain text or graphical. The message may be received by the intermediary party.

At 206, parsing the message to map to a command is performed. The parsing may be performed by the intermediary party. In particularly, the user or input message is parsed and mapped to commands that are defined in the configuration file or profile.

At 208, running the command is performed. The command may particularly be performed at the backend application or solution at a software provider. After the command is performed, output results are generated. For example, a list of customers as requested by the user in the input message may be generated.

At 210, displaying the results is performed. The displaying may be made on the device (e.g., mobile device) of the user. The displayed message may be performed using a layout defined in the configuration profile.

Figure 3:
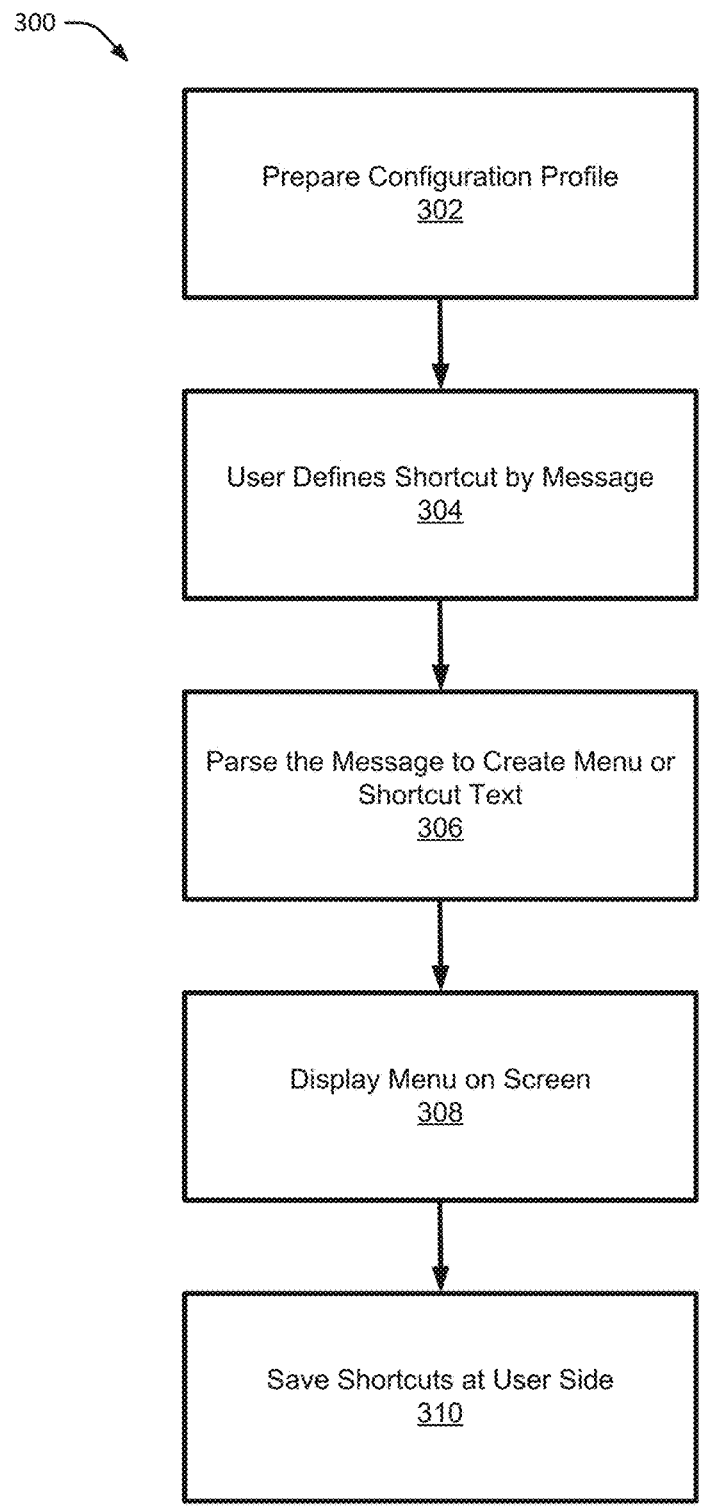
FIG. 3 illustrates an exemplary process.

FIG. 3 shows an exemplary process 300 for implementing, at least in part, the technology described herein. In particular, process 300 depicts another example flow as to providing user defined shortcuts for an application or solution. The process 300 may be performed by a computing device. An example architecture of such a computer device is described below with reference to FIG. 5.

At 302, preparing the configuration profile is performed. The preparing may be performed by an intermediary party. The supported configuration profile may include supported commands and other pattern information, such as a predefined shortcut or menu.

At 304, defining or modifying a shortcut menu is performed. The defining or modifying may be performed by a user. For instance, the user may define or modify the shortcut by an input message such as, for example, creating a menu or shortcut "T3" for "top 3 customer names."

At 306, parsing the user or input message is performed. The parsing may be performed by the intermediary party. The parsing may include creating a menu on the screen of the user's device (e.g., mobile device) screen).

At 308, displaying the menu is performed. The displaying may be made on the device (e.g., mobile device) of the user. The displayed message may be performed using a layout defined in the configuration profile.

At 310, saving the shortcut or menu is performed. The saved shortcut or menu may be at the user's device (e.g., mobile device).

FIG. 4 shows an example graphical representation of a user interface implementing the technologies described herein. The representation 400 shows a mobile device, and particularly a mobile device interface. Device screen 402 shows a user initiating a lightweight application as described. The lightweight application launches device screen 404 that shows a menu that allows a user to select particular pertinent data related to "customer." After selecting "Top 3 Name" on the menu, device screen 406 is launched which shows information related to "Brad Thompson" and two other top customers "Emily Powers" and "Amanda Costner." Device screen 408 allows user to pick "Brad Thompson" and then launches into device screen 410 that shows information related to "Brad Thompson." The output message format may be in text or HTML rich text. In certain cases, when a tap is made on the rich text, the lightweight application may allow drilling down to the system, application or solution or from a web page provided by an intermediary party. In certain implementations, the input message may be for a complex case, such as adding a quick order draft. If input messages are not recognized, a default page may be shown.

In most implementations, intermediary providers do not have learn any front end technology for the lightweight application. Intermediary parties may not have to be too concerned about the platform or cross platform issues, e.g., UxStyle. Lightweight applications are relatively easy to publish, deploy and maintain. Users can easily subscribe or unsubscribe to lightweight applications, i.e., lightweight applications may be treated like plugins. End users benefit from a familiar message style interaction. The message style further has a conversation history to allow looking back to. In addition, the message style allows for a drill down capability.

Figure 5:
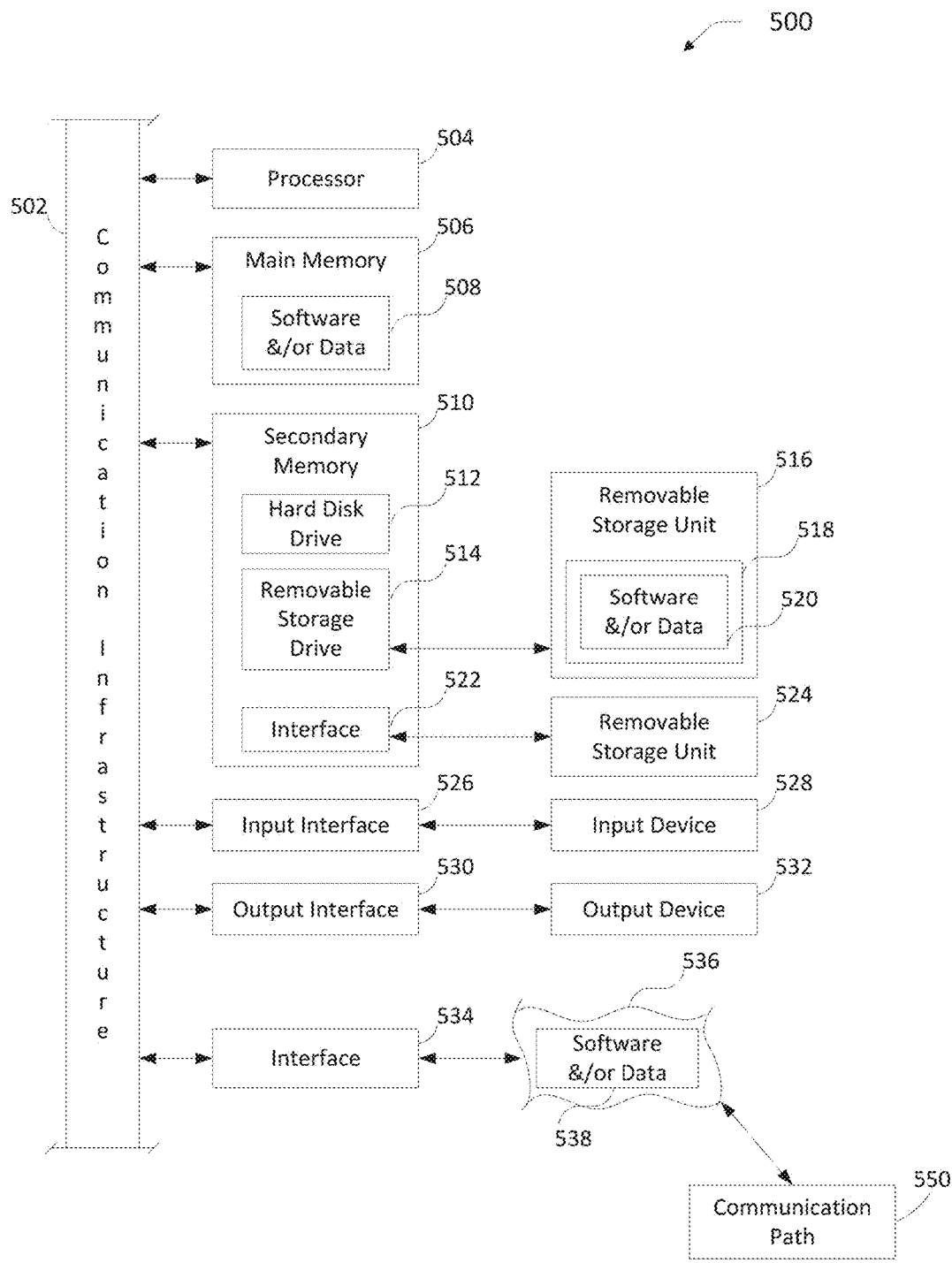
FIG. 5 illustrates an exemplary computing system to implement the technologies described herein.

FIG. 5 illustrates an exemplary system 500 that may implement, at least in part, the technologies described herein. The computer system 500 includes one or more processors, such as processor 504. Processor 504 can be a special-purpose processor or a general-purpose processor. Processor 504 is connected to a communication infrastructure 502 (for example, a bus or a network). Depending upon the context, the computer system 500 may also be called a client device.

Computer system 500 also includes a main memory 506, preferably Random Access Memory (RAM), containing possibly inter alia computer software and/or data 508.

Computer system 500 may also include a secondary memory 510. Secondary memory 510 may include, for example, a hard disk drive 512, a removable storage drive 514, a memory stick, etc. A removable storage drive 514 may comprise a floppy disk drive, a magnetic tape drive, an optical disk drive, a flash memory, or the like. A removable storage drive 514 reads from and/or writes to a removable storage unit 516 in a well-known manner. A removable storage unit 516 may comprise a floppy disk, a magnetic tape, an optical disk, etc., which is read by and written to by removable storage drive 514. As will be appreciated by persons skilled in the relevant art(s) removable storage unit 516 includes a computer usable storage medium 518 having stored therein possibly inter alia computer software and/or data 520.

In alternative implementations, secondary memory 510 may include other similar means for allowing computer programs or other instructions to be loaded into computer system 500. Such means may include, for example, a removable storage unit 524 and an interface 522. Examples of such means may include a program cartridge and cartridge interface (such as that found in video game devices), a removable memory chip (such as an Erasable Programmable Read-Only Memory (EPROM), or Programmable Read-Only Memory (PROM)) and associated socket, and other removable storage units 524 and interfaces 522 which allow software and data to be transferred from the removable storage unit 524 to computer system 500.

Computer system 500 may also include an input interface 526 and a range of input devices 528 such as, possibly inter alia, a keyboard, a mouse, etc.

Computer system 500 may also include an output interface 530 and a range of output devices 532 such as, possibly inter alia, a display, one or more speakers, etc.

Computer system 500 may also include a communications interface 534. Communications interface 534 allows software and/or data 538 to be transferred between computer system 500 and external devices. Communications interface 534 may include a modem, a network interface (such as an Ethernet card), a communications port, a Personal Computer Memory Card International Association (PCMCIA) slot and card, or the like. Software and/or data 538 transferred via communications interface 534 are in the form of signals 536 which may be electronic, electromagnetic, optical, or other signals capable of being received by communications interface 534. These signals 536 are provided to communications interface 534 via a communications path 550. Communications path 550 carries signals and may be implemented using a wire or cable, fiber optics, a phone line, a cellular phone link, a Radio Frequency (RF) link or other communication channels.

As used in this document, the terms "computer-program medium," "computer-usable medium," and "computer-readable medium" generally refer to media such as removable storage unit 516, removable storage unit 524, and a hard disk installed in hard disk drive 512. Computer program medium and computer usable medium can also refer to memories, such as main memory 506 and secondary memory 510, which can be memory semiconductors (e.g. Dynamic Random Access Memory (DRAM) elements, etc.). These computer program products are means for providing software to computer system 500.

Computer programs (also called computer control logic) are stored in main memory 506 and/or secondary memory 510. Such computer programs, when executed, enable computer system 500 to implement the present technology described herein. In particular, the computer programs, when executed, enable processor 504 to implement the processes of aspects of the above. Accordingly, such computer programs represent controllers of the computer system 500. Where the technology described herein is implemented, at least in part, using software, the software may be stored in a computer program product and loaded into computer system 500 using removable storage drive 514, interface 522, hard disk drive 512 or communications interface 534.

The technology described herein may be implemented as computer program products comprising software stored on any computer useable medium. Such software, when executed in one or more data processing devices, causes data processing device(s) to operate as described herein. Embodiments of the technology described herein may employ any computer useable or readable medium, known now or in the future. Examples of computer useable mediums include, but are not limited to, primary storage devices (e.g., any type of random access memory), secondary storage devices (e.g., hard drives, floppy disks, Compact Disc Read-Only Memory (CD-ROM) disks, Zip disks, tapes, magnetic storage devices, optical storage devices, Microelectromechanical Systems (MEMS), and nanotechnological storage device, etc.).

A computing system may take the form of any combination of one or more of inter alia a wired device, a wireless device, a mobile phone, a feature phone, a smartphone, a tablet computer (such as for example an iPad™), a mobile computer, a handheld computer, a desktop computer, a laptop computer, a server computer, an in-vehicle (e.g., audio, navigation, etc.) device, an in-appliance device, a Personal Digital Assistant (PDA), a game console, a Digital Video Recorder (DVR) or Personal Video Recorder (PVR), a cable system or other set-top-box, an entertainment system component such as a television set, etc.

In the above description of exemplary implementations, for purposes of explanation, specific numbers, materials configurations, and other details are set forth in order to better explain the present invention, as claimed. However, it will be apparent to one skilled in the art that the claimed invention may be practiced using different details than the exemplary ones described herein. In other instances, well-known features are omitted or simplified to clarify the description of the exemplary implementations.

The inventors intend the described exemplary implementations to be primarily examples. The inventors do not intend these exemplary implementations to limit the scope of the appended claims. Rather, the inventors have contemplated that the claimed invention might also be embodied and implemented in other ways, in conjunction with other present or future technologies.

Moreover, the word "exemplary" is used herein to mean serving as an example, instance, or illustration. Any aspect or design described herein as exemplary is not necessarily to be construed as preferred or advantageous over other aspects or designs. Rather, use of the word "exemplary" is intended to present concepts and techniques in a concrete fashion. The term "technology," for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

Note that the order in which the processes are described is not intended to be construed as a limitation, and any number of the described process blocks can be combined in any order to implement the processes or an alternate process. Additionally, individual blocks may be deleted from the processes without departing from the spirit and scope of the subject matter described herein.

One or more embodiments described herein may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

What is claimed is:

1. A method for sending data to a user comprising:
uploading a configuration file in an intermediary server, wherein the configuration file defines a menu;
invoking, at a mobile computing device of the user, a lightweight application to display the menu in a graphical user interface;
displaying, at the device, a first text message in response to the user selecting the menu in the graphical user interface;
receiving, by the intermediary server, the first text message from the lightweight application;
mapping, by the intermediary server, the first text message to one or more commands supported by the configuration file;
running, in an application associated with the intermediary server, the one or more mapped commands in order to extract data requested by the first text message; and
displaying, by the lightweight application, a second text message containing the extracted data in a conversation history that includes the first text message.

2. The method of claim 1, wherein the data is one or both of a multimedia object or text.

3. The method of claim 1, wherein the data is extracted from an application, a webpage, a database or a combination thereof.

4. The method of claim 1, wherein the configuration file supports a predefined shortcut related to the data.

5. The method of claim 4, wherein mapping the first text message includes parsing the first text message for the predefined shortcut.

6. The method of claim 1 further comprises drilling down to a system, application, solution or web page in response to a tap on the second text message.

7. The method of claim 1, wherein the first text message is presented in a predefined pattern.

8. The method of claim 1 further comprising sending the data to the user to be displayed on a user device.

9. The method of claim 8, wherein the display is a predefined layout defined by the configuration file.

10. A device comprising:
one or more processors; and
memory coupled to the one or more processors configured to:
upload a configuration file in an intermediary server, wherein the configuration file defines a menu;
invoke a lightweight application residing in a user device to display the menu;
display a first text message in response to a user selecting the menu displayed by the lightweight application;
parse the first text message from the lightweight application;
map the first text message to one or more commands supported by the configuration file;
invoke an accessed application associated with the intermediary server to run the one or more mapped commands in order to extract data requested by the first text message; and
invoke the lightweight application to display a second text message containing the extracted data in a conversation history that includes the first text message.

11. The device of claim 10, wherein the configuration file includes a shortcut related to the data.

12. The device of claim 10, wherein the parsed first text message includes a shortcut.

13. The device of claim 10, wherein the data is a multimedia object, text or a combination thereof.

14. The device of claim 10, wherein the data is extracted from the application, a webpage, database or a combination thereof.

15. The device of claim 10, wherein the second text message includes rich text that enables drilling down.

16. The device of claim 10, wherein the memory is further configured to parse the first text message for a shortcut supported by the configuration file.

17. One or more non-transitory computer-readable media storing processor-executable instructions that when executed cause one or more processors to perform operations comprising:
uploading a configuration profile in an intermediary server, wherein the configuration profile specifies supported commands and other pattern information including a menu and a shortcut defining a replacement for a free text command;
displaying, at a mobile computing device of the user, the menu in a graphical user interface of a lightweight application residing in the device;
displaying, at the device, a first text message in response to the user selecting the menu in the graphical user interface;
receiving, by the intermediary server, the first text message from the lightweight application;
mapping the first text message to one or more commands supported by the configuration profile;
running, in an application associated with the intermediary server, the one or more mapped commands in order to extract information requested by the first text message; and
displaying, by the lightweight application, a second text message containing the extracted information in a conversation history that includes the first text message.

18. The one or more computer-readable media of claim 17, wherein the information is text, graphics or a combination thereof.

19. The one or more computer-readable media of claim 17 wherein the configuration profile supports extensible markup language (XML) or JavaScript Object Notation (JSON).

* * * * *